Sept. 16, 1947. G. KEINATH 2,427,355
FLASH PRINT RECORDER
Filed Feb. 12, 1944 5 Sheets-Sheet 1

INVENTOR
George Keinath.
BY
ATTY.

Sept. 16, 1947.  G. KEINATH  2,427,355
FLASH PRINT RECORDER
Filed Feb. 12, 1944  5 Sheets-Sheet 2

Fig.5.

INVENTOR
George Keinath.
BY
ATTY.

INVENTOR
George Keinath.

Sept. 16, 1947.        G. KEINATH            2,427,355
                  FLASH PRINT RECORDER
            Filed Feb. 12, 1944          5 Sheets-Sheet 5

INVENTOR
George Keinath.
BY
ATTY.

Patented Sept. 16, 1947

2,427,355

UNITED STATES PATENT OFFICE 2,427,355

FLASH PRINT RECORDER

George Keinath, Larchmont, N. Y.

Application February 12, 1944, Serial No. 522,140

21 Claims. (Cl. 234—1.5)

My invention relates to electric systems for indicating or recording variable measuring quantities and especially to symbol printing recording systems for determining a multiplicity of such variable quantities on a common record-receiving surface.

For such purposes as testing or supervising extensive machine aggregates, power or propulsion plants, manufacturing processes, or experimental apparatus and apparatus combinations, it is often desirable to measure and record in as little time as possible a multitude of data derived from a large number of measuring gauges.

For instance, certain experimental, supervisory or inspection tests in aircraft require measuring and recording of as many as over one hundred different variable quantities, such as exhaust gas and other temperatures at different points of the propulsion plant, mechanical strains and stresses occurring at different points of the aircraft structure, and quantitative data of the flight conditions of the craft; and these quantities are to be measured and recorded repeatedly within extremely little time so that the recorded data are properly correlated to one another as regards time and conditions of occurrence and, with respect to the individual measuring points, follow one another in a sufficiently quick sequence to afford an observation of satisfactory continuity.

The large number of measuring gauges and appertaining apparatus and the limitations in available space or permissible weight render it impossible or impractical to use individual recording instruments for each gauge or even multiple recorders of the type that trace a diagram directly for each measuring gauge. For this reason, a single recording apparatus is used for such purposes and provided with symbol or figure printing means, which during the measuring operation, record a collection of separate notations to be evaluated at a later time. Selective contactors are provided for connecting this apparatus sequentially and cyclically with the different measuring gauges. Systems of similar type are, of course, also advantageous in the above-mentioned cases other than the testing of aircraft, where a collection of very many data in a concise form, a highly condensed record, or reduced space requirements, low costs or low weight of the apparatus are more desirable than the direct tracing of curves.

My invention, in one of its main aspects, relates to multi-point recording systems of the just-mentioned type and aims at improvements which will best be understood by comparison with systems of this type heretofore available.

In this country there are at present two manufacturers offering multi-recording systems, of the type above referred to, designed especially for the testing of airplanes. Each of these available systems is capable of taking readings from up to 140 or 144 measuring gauges, particularly temperature-measuring thermocouples. The recording apparatus proper of these systems contains a moving, chart-type recording sheet acted upon by a movable printing stylus which, when pressed against the sheet, prints a point and a figure whose specific location in the transversal direction on the chart is indicative of the value of the measured quantity, for instance temperature, and whose amount together with another locational component serve to identify the particular gauge that measured the recorded quantity.

According to one of the recognitions underlying this invention, these ways and means of producing multiple records involve requirements which impose several limitations on the known systems. For instance, the fact that the location of the recorded notations has to be changed transversely of the recording sheet requires a sheet and recording mechanism of relatively large width. Thus, the recording chart of the known apparatus has a width of about 250 mm., the individual notations being very small and distributed over the chart surface most of which remains blank after completion of the recording operation. Due to the small size of the individual notations and since their reading requires determining the ordinates of their position on the chart, the evaluation of the recorded notations is inconvenient despite the large size of the chart. The size of the recorder proper and the operation and transversal motion of the printing stylus mechanism necessitate a relatively great total weight and compass of the complete system and limit also the obtainable maximum speed as well as the number of applicable measuring gauges. Thus, one of the above-mentioned known systems, including all necessary apparatus, weighs over 150 pounds for at most 140 gauges and requires about 1.63 seconds for taking an individual measurement, and the complete cycle for 140 gauges plus seven identification points lasts 240 seconds. Under rapidly varying operating or flight conditions, this period would be far from satisfactory so that a smaller number of measuring points has to be used. The other above-mentioned known system has a weight of similar magnitude and requires a minimum individual recording period of about 1.25 seconds.

It is an object of my invention to devise a multi-point recording system for the purposes above-referred to that produces a record of a multitude of data which, other conditions being similar, is of considerably smaller total width or size, or accommodates a much greater number of notations, or produces individual notations of increased size and improved legibility, or preferably combines several or all of these advantages over the known systems.

Another object of my invention is to provide a system of the type here in point, whose record is composed of individual notations which, for their meaning, do not depend on differences in position transversely of the recording surface; and a correlated objected is to produce separate recordings or notations that are fully self-contained, i. e. composed of symbols or images of symbols, such as letters or figures alone or together with other indicia, which as such identify one of the measuring gauges and also convey the complete information necessary for determining the quantity measured by that gauge, in order to facilitate reading or evaluating the record.

Still another object of the invention aims at providing a multi-point recording system of increased operating speed as regards the individual measuring and recording operations.

An object is also to afford using in systems of this type a larger number of measuring points than heretofore applicable at a given speed of cyclical operation, or to increase the speed of an operating cycle at a given number of measuring points.

A further object of my invention is a reduction in total weight or space requirements or both, without disadvantage as regards the operating speed or the number of applicable measuring points of the multi-point recording system.

It is also among the objects of the invention to improve the accuracy of a system as here referred to, or to achieve any one or several of the aforementioned objects without appreciable loss in accuracy or, if desired, together with a greater accuracy than obtained in the known multi-point recorder systems.

One of the more specific objects of my invention aiming primarily at a reduction in weight and compass or at increased accuracy or increased operating power, is to permit using in such measuring systems translating or other auxiliary devices which, like bolometric amplifiers, are advantageous in some respects but cannot ordinarily be used because their large time constant or sluggish operation would tend to reduce the operating speed of the system. It is, of course intended, in this aspect of my invention, to take advantage of the desirable qualities of such auxiliary devices without incurring the disadvantages of a reduced operating speed of the measuring and recording operation.

It is also an object of this invention to provide a system of the type referred to whose operating speed can be controlled at will within wide limits, by means of a single adjustment if so desired, and whose component apparatus are so controlled, one by another, that they are automatically synchronized or speed-regulated when the speed of one of them is varied.

Another object of my invention, in conjunction with any of those above-mentioned, is to devise a system as explained above, whose accuracy of operation is largely independent of its operating speed so that the measuring results are not affected by uncontrolled variations in the speed of the driving means or the voltage of the current source energizing the drive.

According to my invention in one of its basic aspects, a multitude of electric measuring or control elements such as thermocouples, resistance thermometers, strain gauges, pressure gauges or vibration pickups, are provided for varying an electric current magnitude—for instance a voltage, current intensity, resistance, inductance or capacitance—in accordance with the variations of the quantities to be measured. These measuring elements or gauges are connected with an electric measuring apparatus by means of a selector switch or the like sequentially operating contact means so that only one of the measuring gauges is in electric connection with the apparatus at a time. The measuring apparatus is provided with a movable indicating or exhibiting device which carries a row of characters, figures or other symbols representative of the value of the quantity to be measured. Associated with the just-mentioned symbol carrying device are recording means which are controlled by the abovementioned measuring apparatus so as to record an image of one of the symbols of the indicator at a moment in which the recorded symbol is indicative of the value to be determined.

Since the invention will be more readily understood from a description of systems and apparatus designed and operative in accordance therewith, further essential features, objects and advantages of the invention will be referred to hereinafter in conjunction with the following description of the embodiments illustrated in the drawing.

A fourth embodiment of a system according to the invention is represented by Figs. 10 and 11. The measuring network of this system is based on a resonance method. Fig. 10 shows the basic circuit diagram of the system, while

Lastly, Figs. 13 and 14 illustrate diagrammatically a system, also in accordance with the principles of my invention, which permits transmitting the values measured by the measuring apparatus to a remotely located indicating and recording apparatus.

In order to facilitate a comparison between the illustrated embodiments and to indicate exchangeability of combination elements, the following scheme of reference characters has been applied in the above-mentioned figures: In all embodiments, the control elements or gauges are denoted by the letter T or G, alone or together with a numbering index such as in T2 or G3. The selector switch means are denoted by SS, the variable impedance device of the measuring apparatus or network proper by VI, the appertaining control relay by CR, while the control circuit controlled by the relay is marked CC. Wherever used, a lamp is denoted by L, a photographic recording device by CA, a counting device of the register type by NS, and a current source by CS. The last two digits of the reference numerals are the same for different embodiments when referring to functionally similar items.

The multi-point recording system according to Figs. 1 through 5 is applicable for measuring temperatures on airplanes during test flights taken at various points of exhaust gas conduits and other parts of the propulsion machinery or other equipment. A large number of thermocouples denoted by T1, T2, T3, etc. is located at these measuring points. The thermocouples are connected with the selector switch SS which, in this embodiment, is of the double-pole type and has two movable contact members 101 and 102 mounted on a shaft 104 actuated by a motor 105 of the step-switch type. As schematically shown, the stepping motor has a ratchet 106 for driving the contactor shaft 104, and a pawl mechanism 107 for driving the ratchet 106. The pawl mechanism is intermittently operated by an electromagnet 108 which is connected through a switch 109 with a suitable current source CS consisting preferably of the available electric power line. The circuit of the control magnet 108 extends also through a periodically operated contact mechanism appertaining to the potentiometric measuring apparatus VI to be described in a later place. Each impulse transmitted to the magnet 108 advances the contact members 101 and 102 one step of their cycle. The thermocouples T1, T2, etc. are connected to the contact banks 111 and 112 which are cyclically scanned by the contact members 101 and 102. The contact members are connected with the two poles of the input circuit 143 of an amplifier 141 which obtains the necessary power supply through a circuit 142 fed from the current source CS. The output leads 144 and 150 of the amplifier are connected with a measuring apparatus which contains a balanceable potentiometric network of the type represented by Figure 2. As apparent from Fig. 2, the amplifier 141 is connected through a control relay CR with the output terminals of the resistance 171 of the potentiometer VI. The resistance 171 is energized by a constant current source, here represented by a battery BA, through a galvanometer GA and an adjusting rheostat AR. The slide contact 173 of the potentiometer is periodically moved through its entire range of adjustment so that the voltage drop across the output terminals of the potentiometer circuit will periodically pass through a balance value that is equal and opposite to the amplified voltage value of the thermocouple. At the moment of balance, the voltage across the zero branch 150 of the measuring circuit passes through zero and reverses its direction. As a result, the contact device of the control relay CR switches from one position to the other and thereby produces a control impulse in the circuit CC. This impulse is used for indicating and recording the instantaneous position of the potentiometer slide 173 as will be explained in the following.

Figure 1:
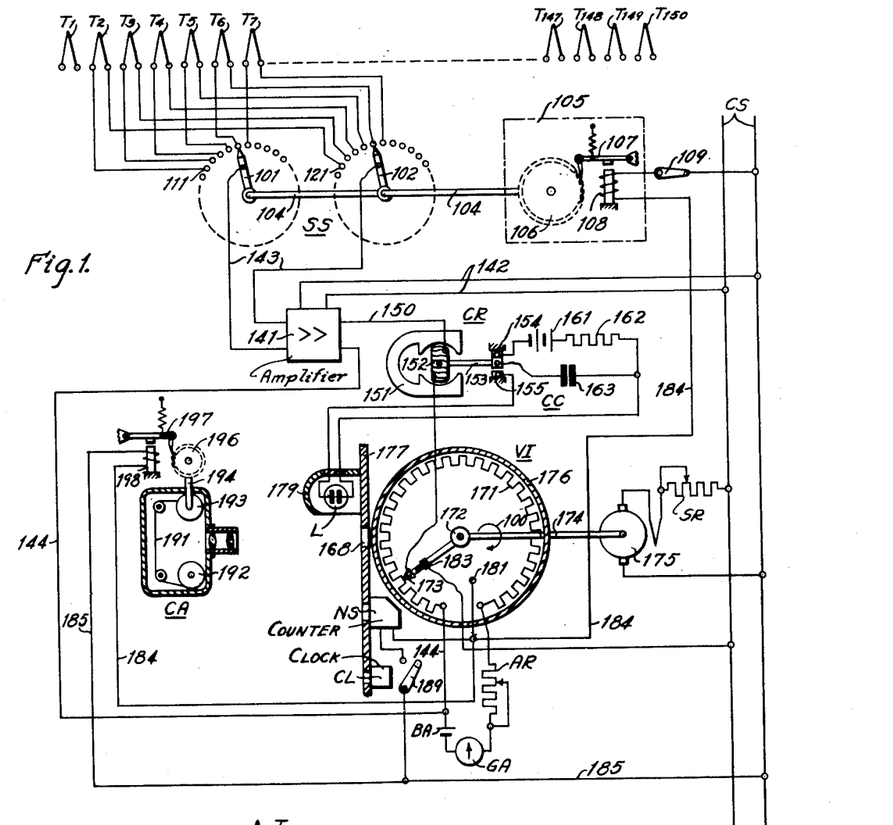
Figure 1 represents the circuit diagram of a multi-point recording system in accordance with my invention in which a multitude of temperatures is measured by means of thermocouples and recorded by photographic recording means under control by a potentiometric measuring network of the balanceable type.
Figure 2:
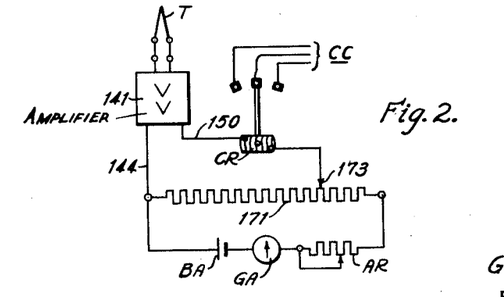
Fig. 2 is explanatory and shows a scheme of the balanceable measuring circuit used in the system according to Fig. 1.

Reverting to the more detailed illustration in Fig. 1, it will be seen that the control relay CR is of the moving coil type. The permanent magnet system of the relay is denoted by 151 and the moving coil by 152. The coil is connected with a movable contact 153 which in one position engages a stationary contact 154 and in the other a stationary contact 155.

The control circuit CC includes a current source, for instance a battery 161, and a series resistor 162, both connected to the contact 154, and also an energy storing device here represented by a capacitor 163 which is connected with the movable contact 153. When the moving coil 152 and the appertaining contact 153 assume the illustrated position, the capacitor 163 is charged by the battery 161 through resistor 162. When the voltage across the zero branch of the measuring circuit reverses its direction, the contact 153 switches over to the stationary contact 155, thereby disconnecting the capacitor 163 from the battery and discharging it through a lamp L. This lamp is of the gaseous discharge type and produces a light flash of sufficient intensity to illuminate the indicating device still to be described. Due to the fact that the motion of the relay contact 153 is limited by the stationary contacts so as to extend over a very limited distance, the flash discharge starts virtually immediately at the moment of balance. Since further the capacitive discharge is self-terminating and exhaused within an extremely short interval, the flash is of very short duration.

The resistor 171 of the potentiometer VI, is of circular shape, that is, it consists of a slide wire preferably formed by a helix wound about a circular geometrical axis. The appertaining slide contact 173 is carried by a rotary member 172 whose shaft 174 is driven by a motor 175. This motor may consist of any suitable driving device, for instance, a spring operated mechanism or an electric motor of any available type. This possibility of using various kinds of driving means for the variable impedance device is due to the fact that the operation of the system is not predicated upon maintaining a constant speed because its accuracy of measurement is not affected by speed variations. According to the embodiment of Fig. 1, I prefer using an electric variable speed motor 175 which is fed from the current source CS through a speed regulator SR. The terminals of the potentiometer resistor 171 are connected with a current source BA of substantially constant voltage in accordance with the scheme represented by Figure 2.

When in operation, the slide contact 173 will repeatedly rotate through its cycle of operation in the direction of the arrow 100. A stationary contact 181 is located so that it is contacted by a movable contact 183 at the end of each operating cycle. The movable contact 183 is associated with the rotatable member 172 and electrically connected with one pole of the current source CS. Each time the contacts 183 and 181 engage each other, the circuit is temporarily closed from the just-mentioned pole of the current source CS through the contacts 183 and 181, the lead 184, the magnet 108, and the switch 109 to the other pole of source CS. Consequently, a control impulse is transmitted to the magnet 108 of the stepping motor 105. As a result, the selector switch SS is advanced one step after each completion of an operating cycle of the potentiometric device VI. That is, the potentiometer varies its measuring resistance once through its entire range for each of the thermocouples. Consequently, the potentiometer circuit will pass through its balance condition during each interval in which one of the thermocouples is connected with the measuring apparatus.

An indicator or exhibiting member 176 (symbol wheel) is so synchronized with the movable member 172 of the potentiometric device that it rotates at the same speed. This synchronism is achieved simply by placing the exhibiting member 176 on the shaft 174 of the potentiometric device as is apparent from Fig. 3. According to this figure, a stationary bearing 165 for the shaft 174 is provided with rigid and stationary arms 166 which carry an annular insulating core member 167. The potentiometric resistor 171 consists of a resistance helix and is wound over the core 167. The slide contact 173 engages the resistor 171 resiliently and is mounted on member 172 which in turn is firmly attached to the shaft 174. Consequently, the movable contact 173 and the member 176 rotate together. In the embodiment according to Figure 3, the member 176 forms also a casing for the potentiometer resistor and the appertaining movable contact 173.

The peripheral surface of the exhibiting member 176 is provided with a row of symbols 178 consisting of figures, letters or the like characters preferably in conjunction with a measuring scale. The exhibiting member is covered towards the recording portion of the apparatus by a partition or plate 177 (Figs. 1, 3 and 4) which has a window 168 through which only a small portion of the indicator surface is visible at a time. A wire or hair 169 (Figs. 3 and 4) is strung across the window 168 in order to serve as a reference line for the symbol and scale appearing in the window.

Figure 3:
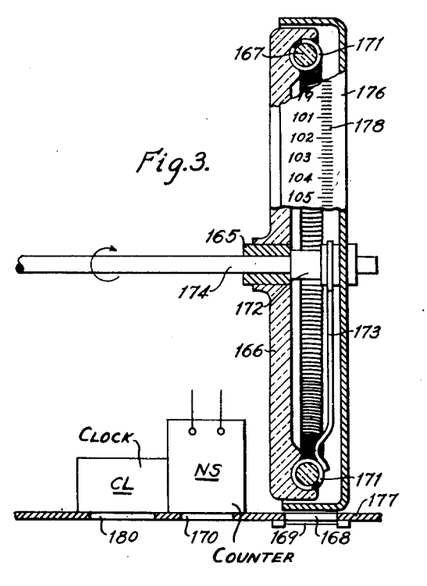
Fig. 3 shows a partial and part sectional view of the potentiometric device and appertaining indicating member as well as several other parts of the measuring apparatus of the same system.
Figure 4:
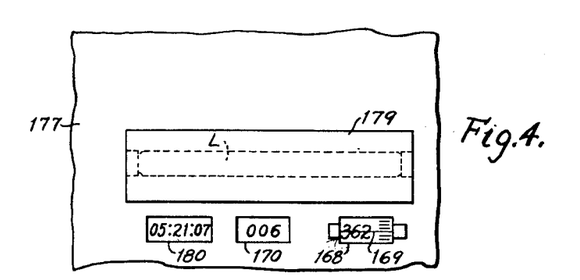
Fig. 4 is a front view of the face panel of the apparatus shown in Fig. 3.

A register or counting device NS and a time indicating device consisting, for instance, of an electric or mechanical clock mechanism are also associated with the indicating device. Both the counter and the time indicating mechanism are provided with indicating symbols which appear behind the windows 170 and 180, respectively, of the face plate 177 of the apparatus (Figs. 3 and 4).

The counter or register NS is electrically operated so as to advance its register one step upon each individual energization. According to Figure 1, one pole of the register NS is connected with the above-mentioned lead 184, while the other pole is connected with the pole of opposite polarity of the current source CS through a lead 185 and a switch 189. Due to this connection, and with switch 189 closed, the counting register NS receives a single control impulse each time the contacts 183 and 181 of device VI engage each other. Hence, the indication of the register advances one step each time the selector switch SS is caused to advance one step. As a result, the indication of the register NS at any time is representative of the particular thermocouple then in operation.

It will therefore be understood that the symbols appearing in the three windows 168, 170 and 180 of the face plate 177 (Fig. 4) contain the full information necessary for the evaluation of each individual measurement performed by the system. That is, the symbol appearing in window 168 is indicative of the value of the quantity to be measured, the symbol or number appearing in window 170 identifies the particular measuring gauge and measuring point and thereby also the character of the measurement which are correlated to the measured quantity, and the indication appearing in window 180 identifies the time point of measurement so as to distinguish this measurement from those taken with the same measuring gauge at previous or subsequent cycles of operation. This time indication serves also to establish a relation of each individual measurement with measurements taken by other gauges at preceding or subsequent cycles.

As schematically shown in Figure 1, a photographic apparatus CA is located relative to the windows of the plate 177 so as to record simultaneously the images of the symbols appearing in the three windows 169, 170 and 180. A recording strip such as photographic film or paper tape passes from a spool 192 onto a spool 193. The shaft 194 of spool 193 is driven by a stepping mechanism of a type similar to the drive 105 of the selector switch SS. As shown schematically, the driven ratchet gear 196 of the recorder mechanism is actuated by a pawl 197 whose operating magnet 198 is connected with the aforementioned leads 184 and 185 and hence is connected in parallel to the counting register NS. As a result, the recording strip 191 is advanced one step after each completion of an operating cycle of the potentiometric device VI.

Having explained the details of the recording system, its performance as a whole will now be readily understood. Let us assume, for instance, that the elements of the system assume the instantaneous position shown in Figure 1 at a selected instant of a measuring operation. In this instant the thermocouple T6 has its two poles connected through the movable contacts 101 and 102, respectively, with the amplifier 141 whose output circuit is in operative connection with the measuring apparauts. The movable member 172 of the device VI has already left its starting position moving in the direction of the arrow 100, thereby changing the measuring resistance portion of the potentiometric device from lower to higher values. In the instantaneous position represented in Figure 1, the effective measuring resistance and hence the voltage drop between the movable potentiometer contact 173 and the adjacent terminal connected to lead 144 are still too low to balance the amplified voltage derived from the thermocouple T6. Consequently, the movable contact 153 of the control relay CR is in a position, as illustrated, wherein the capacitor 163 is charged. During the subsequent travel of the slide contact 173 it will pass through the angular position in which the voltage drop across the measuring portion of the potentiometer resistance balances the amplified thermocouple voltage so that the relay contact 153 will switch over, thereby causing the capacitor 163 to flash the lamp L. At the same moment the indicator member 176 has an angular position indicative of the angular location of the slide contact. Consequently the flash of the lamp L will illuminate a symbol in window 168 which is indicative of the temperature to be measured. The instantaneous illumination produces an exposure of the recording strip 191 in the photographic apparatus CA. The image produced on the strip shows all symbols which appear simultaneously in the windows 169, 170 and 180; and the windows are preferably so arranged that these symbols appear together on a single line. The movable member 172 of the potentiometric device continues its travel until it reaches the end of its cycle. Then the contacts 181 and 183 become effective to switch the selector SS over to the thermocouple T7, at the same time advancing the register NS one step so that its indication is in accordance with the newly selected thermocouple. Simultaneously the recording strip 191 is also advanced in order to be ready for recording the next notation. The angular spacing between the terminals of the resistor 171 is so chosen that the interval available between the completion of a measuring cycle and the beginning of the next cycle is sufficient for operating the selector switch, counting register and strip transport. An angular distance of 20 or 30° is, as a rule, sufficient for this purpose at the highest operating speeds exemplified hereinafter in this specification.

Figure 5:
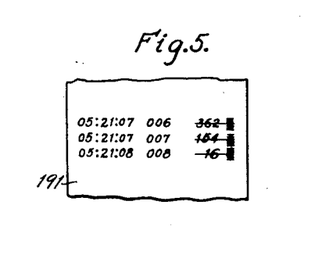
Fig. 5 is an example of a record as obtained in the system according to Figs. 1 to 4.

An example of a record produced on the recording strip 199 is shown in Figure 5. Each line or notation of this record is fully self-explanatory, i. e., it contains all data necessary for the evaluation of the measurements. For instance, the first line of the illustrated record, in accordance with the positions of the apparatus shown in Figure 1 and the showing in Figure 4, indicates that the thermocouple T6, identified by the number 006, measured a temperature value of 362.2 at a time identified by 5 hours, 21 minutes, 7 seconds. The next notation on the record strip relates to the measuring gauge T7 and indicates a quantity value of about 154 at a time within the same second as the preceding measurement. The other notations shown on the record strip will be easily understood in analogy to the foregoing.

An obvious advantage lies in the fact that the records taken with a system of this type contain the different notations within a minimum of space rather than scattered over a large chart surface. Furthermore, all data to be conveyed are represented by self-explanatory symbols and not by the position of the symbols relative to the recording surface. Therefore, the record is not only smaller than in the known systems under otherwise comparable conditions but permits also using larger symbols for each individual notation and placing the symbols one above the other. As a result, the chart combines small size with a considerable improvement in legibility and convenience of interpretation and evaluation. For example, a strip of 50 mm. width suffices to accommodate within the same operating period all notations for which a 5 times wider chart is required in the known systems.

Another essential advantage of the system is the fact that it affords a considerable reduction in space and weight as compared with the available systems of comparable type. These advantages are due to the reduction in size and weight of the necessary recording apparatus as well as to the fact that relatively low forces and torques are required to produce the recorded images, in contrast to systems in which a motion and depression of a printing stylus or the like apparatus is employed.

A further essential advantage inherent in a system of the type described consists in its highly increased potential operating speed. This improvement is due to the continuous measuring operation and the avoidance of a transmission of mechanical force between the indicator member and the recording strip.

The above-mentioned advantages are achieved without reduction in accuracy as compared with the known systems. As a matter of fact, the invention also permits increasing the measuring accuracy, if desired, above that heretofore obtainable.

These advantages will be more fully understood from a quantitative example. With an exhibiting member of cylindrical shape, such as the one denoted by 176 in Figure 3, having a diameter of 300 mm., a slide wire of about 1000 mm. can be accommodated within the circumference of the cylinder as shown in the just-mentioned figure. In this case a circumferential length of 1 mm. along the resistor represents 1/10 of 1% of the measuring range. Consequently a departure from the correct balance position by an amount in the order of 1 mm. does not appreciably affect the accuracy. Incidentally, the accuracy of other parts of the system, especially that of the thermocouples, is often less than that of this measuring and indicating apparatus.

A cylinder of the just-mentioned size accommodates on its peripheral surface readily 200 figures each 5 mm. high, and the subdivisions of the scale placed adjacent to the figures may be spaced in intervals of about 0.5 mm. These dimensions are large enough to be easily applicable. The cylindrical indicator and the movable potentiometer contact can be rotated five times per second, for instance, so that each cycle is completed within 200 milliseconds. It is no problem to produce a light flash in a spark gap or gaseous discharge lamp of 0.1 to .01 or even of about 0.001 milliseconds so that the indicating symbols appear to be stationary within the duration of each individual flash. With dimensions as exemplified, the apparatus is rugged and can be used on conveyances under considerable vibration and acceleration, that is, under conditions where the known recording systems are apt to fail.

The high operating speed of the above-described system permits either reducing the duration of a complete cycle of operations or increasing the number of measuring gauges applicable with a single measuring and recording apparatus. For instance, under the above-mentioned dimensional conditions, a complete operable cycle for 150 measuring points lasts only thirty seconds. This high speed allows other simplifications. For instance, if only one or a few selected measuring gauges are to be used, it is merely necessary to disconnect the other measuring gauges without making further changes in the connections of the measuring system proper. Due to the fact that each individual gauge is scanned by the selector switch each thirty seconds, the just-mentioned way of operation is applicable in cases where the known systems would not produce satisfactory results because the intervals between subsequent measurements for each measuring point are too long in these systems so that it is necessary to stop the selector switch or to introduce other complications into the system in order to limit the measuring operation to one selected measuring gauge. It will be understood, however, that in cases where continuous or very rapidly following measurements are to be recorded from a single selected measuring gauge, the system according to the present invention may also be used in such a manner that the selector switch SS is stopped while in engagement with the selected gauge. In order to permit an operation of this type, the switches 109 and 189 (Fig. 1) are opened after the selector switch SS has been properly adjusted. Then the motor 175 is energized, as described previously. As a result, repeated measurements will be taken by the variable impedance device and will be recorded on the strip 191 in a succession of lines in which the notation identifying the measuring gauge remains the same due to the fact that the counter NS and the step drive of the selector SS remain at rest.

Figure 6:
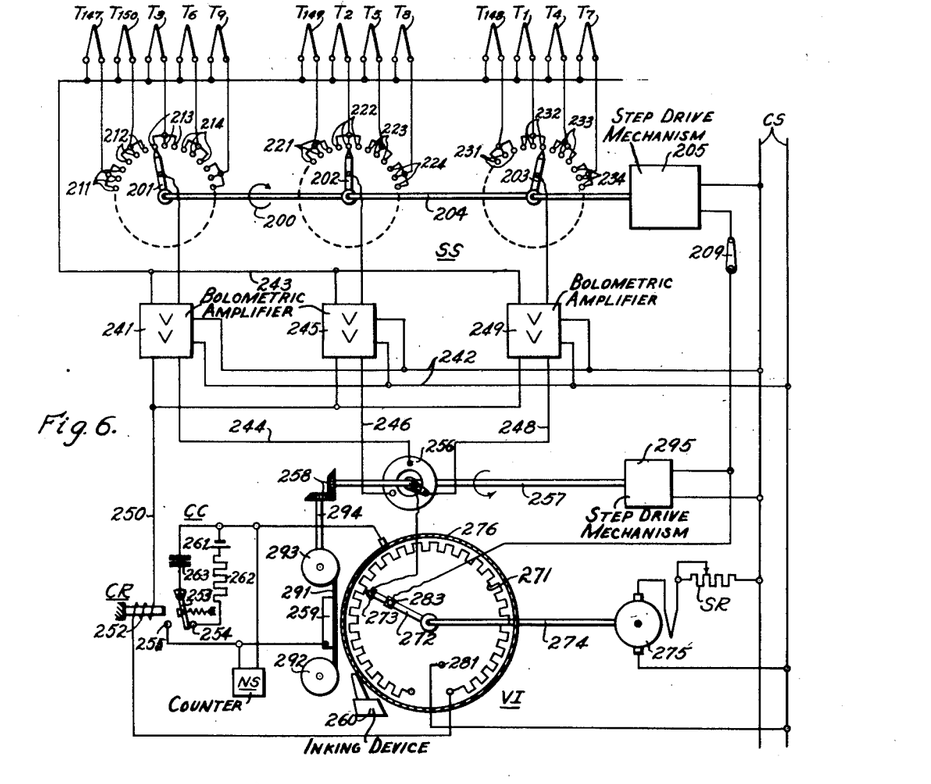
Fig. 6 is a circuit diagram of another multi-point recording system in accordance with the invention. This system contains three sequentially operating amplifiers of the bolometric type and is provided with an electrostatically operating printing device for producing the record.

The recording system illustrated in Figure 6 is also designed and operative in accordance with the basic principles of my invention but is different from the system previously described with respect to a number of features. The system is designed for 150 measuring gauges which are represented by thermocouples and denoted by T1, T2, T3, etc. up to T150. These gauges are arranged in three groups each being connected with one of three contact banks respectively of the selector switch SS. As compared with the selector switch shown in Fig. 1 the system according to Figure 6 exemplifies a single pole connection between each thermocouple and the appertaining amplifier. The three movable contact members 201, 202 and 203 of the switch SS are driven by a common shaft 204. Shaft 204 is actuated by a step drive 205 which, when energized, advances the contact members 201, 202 and 203 one step for each energizing impulse substantially in the same manner as described more in detail in conjunction with the step drive 105, according to Figure 1.

Each of the three movable contact members 201, 202 and 203 is connected with the input poles of three respective amplifiers 241, 245 and 249 whose other input poles are connected by a common lead 243 with the corresponding poles of the thermocouples. The amplifiers are supplied with energy by a circuit 242 fed from the current source CS. The output leads 244, 246 and 248 of corresponding polarity of the three amplifiers are attached to the three stationary contacts of another selector switch 256 whose movable contact member is mounted on a shaft 257 driven by another step drive 295 which is designed and operates substantially in accordance with step mechanisms of the type represented by the drive 105 or the transport mechanism of the apparatus CA in the system of Figure 1. The movable contact of the stepping switch 256 and the common other output lead 250 of the three amplifiers are connected through a relay CR with the potentiometric device VI.

The device VI has a potentiometric resistor 271 in engagement with a rotary slide contact 273 which is mounted on a member 272 operated by a shaft 274 that is driven by an electric motor 275. The motor is energized from the current source CS through a speed regulator SR and, when in operation, runs preferably at a substantially constant speed. The movable member 272 of device VI carries a second contact 283 which engages temporarily a stationary element 281 at the end of each cyclical travel of the movable member. The engagement between the contacts 283 and 281 closes an operating circuit for the step drives 205 and 295 so that the selector switches SS and 256 advance simultaneously one step. At the same time, the transport spool 293 of a recording mechanism is also advanced one step by a synchronizing connection which, in the present embodiment, is obtained by a shaft 294 and a mechanical transmission gear 258. The spool 293 accommodates a recording strip 291 which is pulled off a storage spool 292 so as to pass along the symbol carrying cylindrical surface of an exhibiting member 276 which is mounted on the shaft 274 and serves a purpose similar to that of the exhibiting member 176 in the system according to Figure 1. Details of the indicating and recording means of the system shown in Fig. 6 will be explained in a later place.

The system according to Fig. 6 is designed for a special purpose which will now be explained in order to convey a fuller understanding of the construction and operation of the above-mentioned devices of the system. One of the objects of my invention, as set forth previously, is to reduce the space requirements and weight of the system including all appertaining auxiliary apparatus, such reduction being especially desirable for the application of the system on airplanes. In cases where the effect of the measuring gauges has to be amplified before imposing it on the measuring apparatus proper, the weight and space consumption of the amplifier is appreciable, especially in cases where a relatively large amplification factor is required. This amplification can be obtained with electronic amplifiers. There are, however, other means of amplifying electric currents or voltages which afford an amplification comparable with that of a multi-stage electronic amplifier while requiring a very greatly reduced overall size and weight. These amplifiers operate on a thermo-electric principle and have become known under the name bolometric amplifiers. They have been developed and used for measuring purposes, and their design as such is not part of the present invention proper. Amplifiers of this type are described, for instance, in the United States Patent No. 2,172,961 to Merz. For these reasons, the construction of these amplifiers is not illustrated in detail in the present application, and it will suffice to state briefly those features of this type devices that are essential in connection with the present invention.

Bolometric amplifiers contain thermoresponsive resistors, preferably arranged in a Wheatstone bridge circuit whose one diagonal branch is connected to an auxiliary current source and whose other diagonal is connected to the output circuit of the amplifier. The resistors are subjected to a continuous cooling effect produced, for instance, by a stream of air, and this cooling effect is controlled by a movable vane interposed between the resistors and the source of the air stream. The vane is actuated by a galvanometric moving coil instrument which is connected to the input circuit of the amplifier so that the motion of the vane depends on the measuring magnitude effective in the input circuit. Any deflection of the vane from a normal position disturbs the bridge balance and thus causes a proportional current to flow in the output circuit. The thermo-electrical principle involved in such an amplifier produces an amplification of a ratio considerably more favorable than that of a single stage electronic amplifier, and the bolometric devices require only a small fraction in weight and space. However, they are characterized by a relatively large time constant. Consequently, when the primary voltage changes, the amplified secondary voltage reaches its correspondingly changed proportional value only after the elapse of a period which has to be taken into consideration when a high speed operation is required.

In order to render it possible to obtain a further reduction in weight and compass, the present invention contemplates using bolometric amplifiers or other translating devices favorable from this viewpoint, even if such devices have a relatively large time constant.

To this end, the system according to Fig. 6 has the contact elements of the selector switch SS so designed that each individual connection between the measuring apparatus proper and one of the measuring gauges extends continuously over three sequential stepping periods, and the contact means appertaining to different contact banks operate in phase displacement relative to one another so that each three-step interval overlaps the immediately preceding as well as the next following interval. This overlapping phase displacement is obtained in the illustrated embodiment by the following means. The contacts in the bank appertaining to the movable member 201 are connected together in groups of three such as the groups denoted by 211, 212, 213 and 214. The three contacts of each group or the slide contact of member 201 are so designed that a continuous connection is maintained extending over three successive steps of operation. The group 211 is connected with a single gauge, i. e. the thermocouple T147. The next group 212 is similarly connected to a single thermocouple T150, and so forth.

The contacts of the bank appertaining to the movable members 202 and 203 are similarly grouped and interconnected, each group being associated with a single thermocouple.

The groups of each contact bank are angularly displaced relative to those in the other bank. As a result, the movable member 201, in the illustrated position, engages the first contact of group 213, while at the same time the movable member 202 engages the second contact of a group 222, and the third movable member 203 is in contact with the last member of the group 232.

By virtue of the overlapping phase displacement, each individual thermocouple is connected by the appertaining movable member of the selector switch with one of the three amplifiers 241, 245 and 249 during an interval three times as long as the individual stepping period of the selector switch. The phase position of the movable contact in the stepping switch 256 is so chosen that it establishes a connection between one of the amplifiers 241, 245 or 249 with the potentiometric device VI only when the appertaining movable member 201, 202 or 203 of the selector switch has reached the last contact of a contact group. For instance, in the position of the two stepping switches SS and 256 shown in Fig. 6, the movable contact 203 has just moved to the last contact of the group 232 connected to the thermocouple T1. In this position, the output circuit of the appertaining amplifier 249 is connected through the lead 248 with the movable contact member of stepping switch 256 and hence with the slide contact 273 of the potentiometric device VI.

In this manner, each amplifier is given tripled time for reaching the amplifier balance, and thus care is taken of the large time constant of these devices, while the potentiometric device is connected to this amplifier only during the last third of the tripled period. Each individual cycle of the potentiometric device amounts also to only ⅓ of this adjusting period and hence is completed as quickly as in a system having no amplifier or an amplifier of negligible time constant. While thus the operating speed of the system is satisfactorily high, the weight and space requirements of the three amplifier units at a given amplification ratio are greatly reduced over the weight and space requirement of a multi-stage electronic amplifier, including the appertaining transformer or other auxiliary devices. It is obvious that the principle exemplified by the abovementioned bolometric arrangement is also applicable to other amplifiers, rectifiers and other auxiliary or translating devices of relatively tardy operation. For instance, if it is desired to use electronic direct current amplifiers having a relatively large time constant due to the appertaining reactance or capacitance circuits, the above-explained principle of my invention may also be applied to advantage even in cases where a reduction in weight or compass is not obtained or of secondary value. This applies, for instance, also to measuring or translating devices in which the voltage of an accumulated capacitive charge is a measure of time, voltage, or other quantity to be determined, and in which a time constant of relative large magnitude, as compared with the desired measuring or recording speed, is to be put up with.

Figure 7:
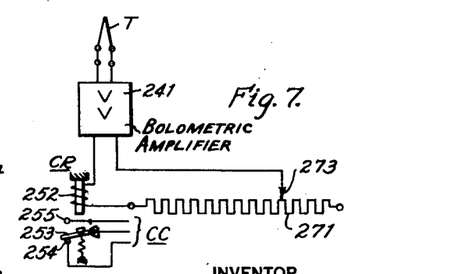
Fig. 7 is explanatory and represents the basic scheme of the measuring circuit employed in the system according to Figure 6, this circuit operating in accordance with a threshold method.

The measuring circuit employed in the system according to Fig. 6 is separately represented in the schematic diagram of Fig. 7. Only one thermocouple T and one amplifier 241 are shown in this figure. The amplifier output circuit extends through the control relay CR and is connected to the movable contact 273 and one terminal of the resistor 271 of the potentiometric device VI. The relay CR in this embodiment is so rated that a given minimum voltage (threshold voltage) is required in order to switch the relay contact 253 in opposition to a biasing spring from a stationary contact 254 to another stationary contact 255. The voltage supplied by the amplifier 241 divides itself between the voltage drop across the relay CR and another voltage drop across the active portion of the potentiometric resistor 271. When the movable contact 271 starts its angular travel, the entire resistor 271 is connected in the output circuit of the amplifier so that the voltage drop across the relay coil 252 is too small to actuate the relay contact. As the potentiometer contact 273 travels along the resistor 271 the voltage drop along the resistor portion remaining in the circuit decreases and the voltage drop across the relay coil 252 increases until at last the entire resistor 271 is cut out of the circuit and the entire voltage is imposed on the relay coil. Somewhere during this travel, the movable contact 273 will pass through an angular position in which the threshold voltage of the relay is reached. Upon passage through this point, the relay CR switches its movable contact 253 into engagement with the stationary contact 255.

As will be seen from Fig. 6, the relay contacts are connected in a control circuit CC which is similar to the corresponding circuit in the system of Fig. 1. That is, a capacitor 263 is connected with a battery 261 through a resistor 262 as long as the energization of the relay CR remains below the threshold value. As soon as the movable relay contact is switched over, the capacitor 263 is discharged and actuates a counting device NS as well as the recording mechanism.

The system according to Fig. 6 employs an electrostatic printing method in order to produce the images of the symbols to be recorded. The symbol wheel 276 is provided with raised characters similar to those used for book printing, and an inking device 260 is employed in order to ink the raised surfaces of these characters. The recording strip 291 consisting of paper passes along the drum surface in close juxtaposition to the adjacent symbol without contacting the symbol. An electrode 259 is located behind the recording strip 291 and, preferably, is contacted by this strip. This electrode is connected with the stationary contact 255 of the control relay. The symbol wheel 276 or its row of raised characters consist of metal and are connected with the other pole of the discharge circuit. When the capacitor 263 is discharged, the electrostatic effect between the electrode 259 and the then adjacent character of the symbol wheel 276, assuming a proper polarity to be chosen, will cause the ink to be transferred from the character to the recording strip 291, thus producing an image on the strip.

Due to the fact that the electrostatic effect occurs instantaneously at the moment when the relay voltage passes through the threshold value and since this effect is terminated immediately with the exhaustion of the capacitive discharge only one character is recorded on the strip at a time.

The electrostatic printing principle involved in the above-described apparatus has the advantage that it does not require a direct contact between the symbol wheel and the recording strip and operates without mechanical power transmitting means. Hence, a system of this nature affords also the advantages mentioned previously in conjunction with the system according to Figs. 1 through 5.

The record produced with the means according to Figure 6 is substantially identical with that represented by Figure 5.

Figure 8:
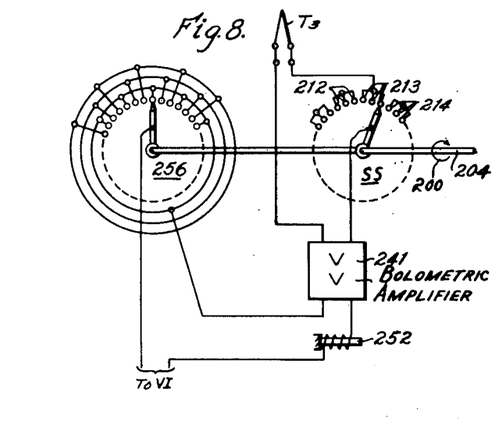
Fig. 8 shows a modified detail of a system otherwise designed in accordance with Fig. 6.

The modification shown in Fig. 8 serves to illustrate that, if desired, the driving means in a system according to the invention may be modified without departing from the operating principles. The diagram of Fig. 8 is intended to represent a system substantially similar to that of Fig. 6 but shows a simplified scheme of only one section of the system. According to Fig. 8, the selector switch 256 forms an additional contact bank of selector switch SS, and the appertaining contact arm is placed on the shaft 204 of switch SS and so wired as to perform the function of the switch 256 in Fig. 7. As a result, a second drive 295 is superfluous. The drive of the recorder may also be derived from shaft 204, or a separate recorder drive may be provided.

Figure 9:
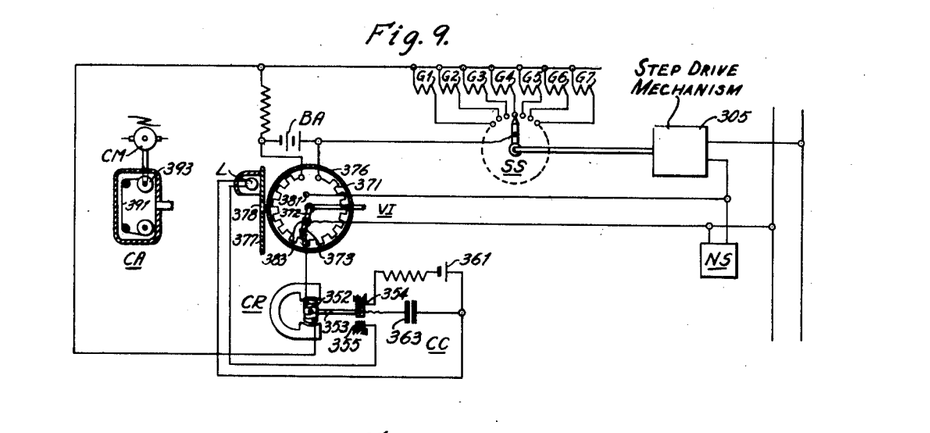
Fig. 9 represents a somewhat simplified circuit diagram of a third embodiment whose measuring circuit is designed for measuring gauges of the variable impedance type and operates in accordance with a Wheatstone bridge method.

While I have illustrated thermocouples in order to exemplify the measuring gauges used in the above-described systems, the design and function of these systems remain substantially the same if gauges of other types are employed instead of or together with thermocouples. The system according to Figure 9, for instance, shows a number of measuring gauges denoted by G1, G2, etc. which consist of variable impedances such as thermoresponsive resistors, variable inductances, variable capacitors, these gauges are connected with the contact bank of a selector switch SS whose stepping mechanism 305 is energized together with a counting mechanism NS in a manner similar to that according to the above-described system. The measuring gauges form part of a bridge circuit which is energized by a current source BA of substantially constant voltage and includes a potentiometer resistor 371 and a slide contact 373. The contact is mounted on a rotatable member 372 which is cyclically operated by a suitable motor (not illustrated in Fig. 9). The zero branch of the bridge circuit connected to the slide contact 373 includes the moving coil 352 of a control relay CR whose movable contact 353 engages one or the other of two stationary contacts 354 and 355 for controlling a circuit CC so as to discharge a capacitor 363 which has previously been charged by a current source 361. The discharge flashes a lamp L or other light source and thereby illuminates through the window 378 of a plate 377 one of the symbols carried by a symbol wheel 376 in the same manner as described in conjunction with Figs. 1 through 5. The light flash occurs at the time when the bridge circuit is balanced so that the illuminated symbol is indicative of the quantity to be measured by the gauge then connected to the bridge network. The flash exposes the recording strip 391 of a photographic apparatus CA whose transport spool 393 is driven by a motor CM. While this motor can be synchronised with the selector switch or with the operation of the variable impedance device VI in the manner previously described, the illustration in Fig. 8 serves to exemplify a modified mode of driving the recording strip. According to Fig. 8, the drive motor CM of the recording apparatus is not connected with the other driving devices of the system. It consists of a constant speed motor of any suitable type, for instance of a spring operated mechanism. The speed of this drive is so chosen that the recorded notations appear spaced from each other at the expectable most rapid successions of two recording operations. That is, since the interval between two recordings varies, the moving speed of the recording strip should be so high that a notation recorded near the end of an operating cycle of device VI will not overlap a notation recorded in the initial portion of the immediately following operating cycle. It will be seen that a record produced in this manner is different from the one exemplified by Fig. 5 in showing a different spacing between successive notations. However, since each notation is self contained, this difference is insignificant as regards the reading and evaluation of the record.

Figure 10:
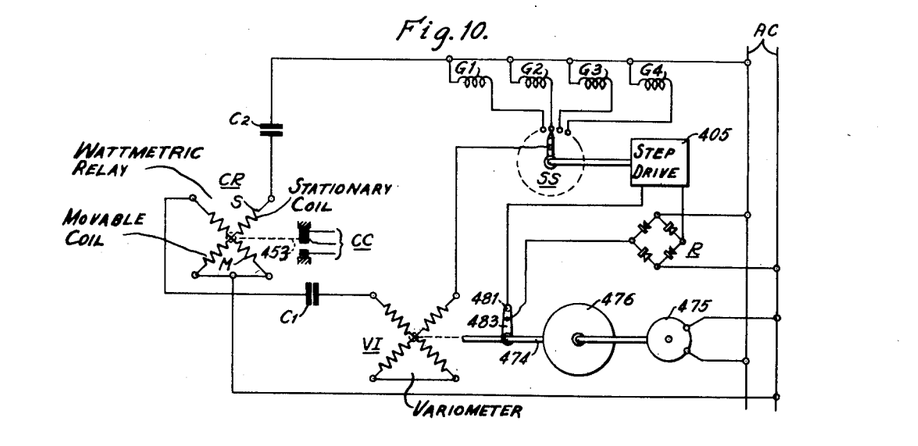

The multi-point measuring system illustrated in Figure 10 embodies the principles of my invention as applied to a measuring circuit which involves a resonance method. The measuring gauges denoted by G1, G2, G3, etc. are sequentially inserted, by the selector switch SS, into a resonance circuit which comprises, in series connection, an inductive potentiometer VI, a capacitor C1 and the movable coil M of a wattmetric relay CR. The resonance circuit is energized by an alternating current line AC of a substantially constant frequency, for instance, of 60 cycles per second. The stationary coil S of the wattmetric relay CR is fed with substantially constant current supplied from the line AC through a capacitor C2 so that the current $i_2$ in the stationary coil S has a phase angle ($\varphi_2$) which is 90° displaced against the line voltage, while the voltage and current in the movable coil M vary in dependence upon the resonance condition of the potentiometer circuit.

The inductive potentiometer (variometer) VI is driven by a motor 475 consisting, for instance, of a synchronous motor energized from the line AC. The potentiometer shaft 474 carries a control contact 483 and a symbol wheel 476. At the end of each potentiometric cycle, the contact 483 engages a stationary contact 481, thereby passing a control impulse from a rectifier R to the step drive 405 of the selector switch SS.

In the illustrated position of switch SS, the inductive gauge G2 forms part of the resonance circuit. Hence, the angular position of the variometer VI at which this circuit is tuned to resonance depends on the inductance $L_x$ of gauge G2 and thus is indicative of that inductance and of the quantity measured thereby. At the point of resonance, the current in the resonance circuit, including the wattmeter coil M, is exactly in phase with the voltage and therefore 90° phase displaced against the current in the stationary coil S. Under these instantaneous conditions, the torque of the movable relay member 452 passes through zero so that this member changes its position and causes a control circuit CC to illuminate the symbol wheel 476 or to otherwise produce a record in the manner described in the foregoing.

Figure 11:
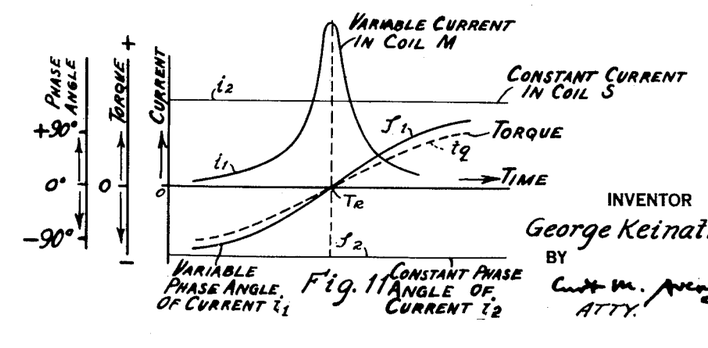
Fig. 11 is explanatory and represents a set of correlated current, phase and torque characteristics.

This effect is elucidated by the diagram of Fig. 11 whose ordinate represents time while the abscissa denotes current intensity, phase angle or torque according to the respective current, phase, and torque characteristics shown in the diagram. The straight line $i_2$ represents the constant current in the stationary coil S of relay CR and the line $\varphi_2$ the constant phase angle of 90° by which this current leads the voltage across the same coil. Curve $i_1$ represents the variable current in the moving coil M of relay CR which at resonance attains a maximum in the moment TR. Curve $\varphi_1$ represents the variable phase angle of current $i$, relative to the voltage across the movable coil M. During an operating cycle of the variometer VI, the current $i_1$ in coil M is at first leading relative to the voltage of coil M. This is apparent from Fig. 11 by the fact that, at the left of time point TR, the phase angle curve $\varphi_1$, has a general relation to the current curve $i_1$ similar to the relation of phase angle line $\varphi_2$ to current line $i_2$. Hence, at first the currents in both relay coils S and M lead the respective voltages and produce a torque (curve $tq$) of a given direction. At the moment (TR) of resonance, the phase angle curve $\varphi_1$ passes through zero, i. e. the current $i_1$ in coil M is in phase with the voltage of coil M and the relay torque ($tq$) is zero. Thereafter, the current $i_1$ becomes lagging relative to the voltage across coil M. As a result, the torque, according to curve $tq$, reverses its direction at the moment TR, thereby reversing the position of the movable relay contact 453.

Figure 12:
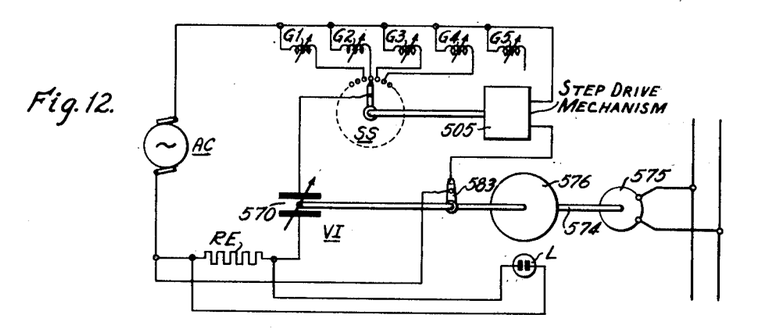
Fig. 12 is the circuit diagram of a fifth embodiment of the invention involving a flash method indication under control by a capacitive potentiometer circuit.

Another potentiometric resonance method is involved in the measuring system shown in Figure 12. A number of measuring gauges, consisting of variable inductance elements GI, G2, G3, etc., are attached to the contact bank of a selector switch SS whose movable member, driven by a stepping mechanism 505 of the type previously described, is connected with a potentiometer VI formed by a variable capacitor 570 and is energized by an alternating current source AC through a resistor RE. A gaseous discharge lamp L or spark gap is connected across resistor RE and has an ignition or break voltage which is larger than the voltage drop across the resistor RE as long as the natural frequency of the oscillatory inductance-capacitance combination of the circuit is out of tune with the frequency of the current source AC. This natural frequency is changed by the inductance variation of the measuring gauge selected by the switch SS and readjusted by the variation of the capacitor 570. That is, at a particular point of travel of the movable capacitor member the voltage drop across the reactance combination will drop substantially to zero and the entire voltage of the current source will appear for a moment across the resistor RE and flash the lamp L. The symbol wheel 576 mounted on the shaft 574 of the capacitive potentiometer and driven by the motor 575 is then illuminated so that the symbol indicative of the measured quantity becomes visible or is recorded as described in conjunction with preceding embodiments. A contact 583, also driven by the motor 575, causes the selector switch to advance one step after the completion of each measuring cycle. Any other oscillatory reactance combination, such as capacitive measuring gauges, inductive potentiometers, additional fixed impedances or capacitances in an arrangement suitable to attain resonance, may be used in a system of this type.

Figure 13:
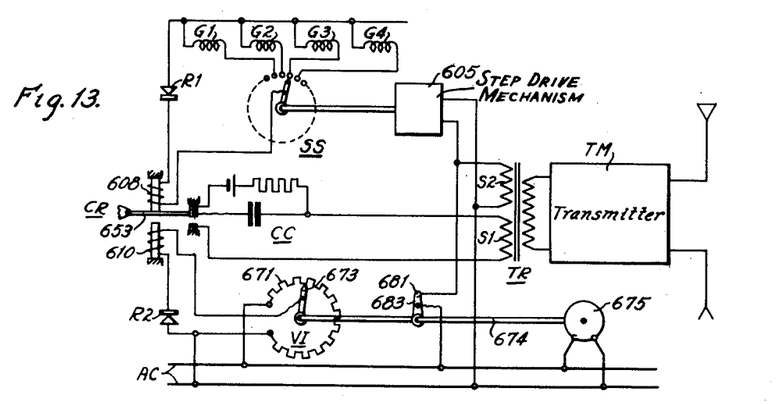
Fig. 13 shows the transmitter portion of this system and Fig. 14 the receiver portion.
Figure 14:
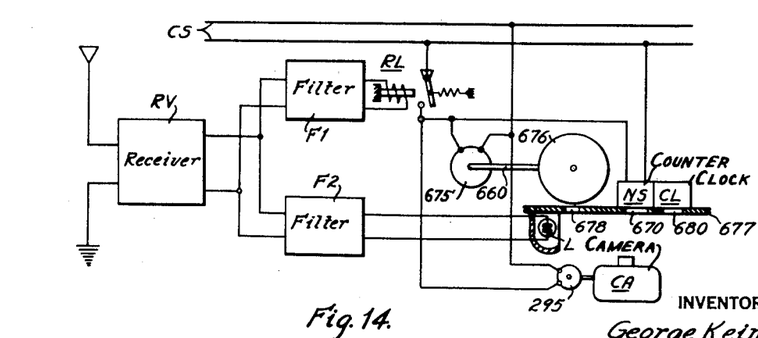

The system illustrated in Figs. 13 and 14 exemplify a system, involving the principles of my invention, which is designed for transmitting the measuring results from an airplane in flight to a ground station. Fig. 13 shows a diagram of the transmitter portion located on the airplane, and Fig. 14 is a schematic showing of the essential circuit connections of the ground station.

The transmitter portion, according to Fig. 13, has a number of measuring gauges GI, G2, etc. consisting of alternating current generating devices, such as vibration pick-ups, connected through a selector switch SS and a rectifier RI with a coil 608 of a differential relay CR. The other relay coil 610 is connected through a resistance potentiometer VI and a rectifier R2 with a current source AC. The resistor 671 of the potentiometer is scanned by a slide contact 673 which is driven by a motor 675 together with a contact 683 mounted on a common shaft 674. Before starting each measuring cycle, the contact 683 passes an impulse through contact 681 to the step drive 605 of switch SS, thereby advancing the switch one step. At the same time a synchronizing impulse is passed through the winding S2 of a transformer TR to the transmitter TM for radio transmission to the ground station. In the receiver portion, as shown in Fig. 14, this impulse passes from the receiver RV through a filter FI and actuates a relay RL. The relay connects a start-stop drive 675' to a current source CS and thereby causes a symbol wheel 676 to start and perform one cycle of operation in sufficiently close synchronism with the motion of the potentiometer slide 673 in the transmitter portion (Fig. 13). The relay RL (Fig. 14) also actuates a number register NS and controls the transport mechanism 295 of a photographic recorder CA.

During each cycle of its periodic travel, the slide contact 673 (Fig. 13) passes through an angular position in which the differential effect of the two relay coils 608 and 610 is balanced, thereby reversing the torque imposed on the movable contact 653. This causes the contact to pass a control impulse through a control circuit CC and a second coil SI of the transformer TR to the transmitter TM. This measuring impulse has a frequency different from the synchronizing impulse above-mentioned. In the ground station (Fig. 14) the measuring impulse passes through a filter F2 to a flash lamp which exposes the recording strip in the manner described in the foregoing. A time indicator CL and an instrument plate 677 with exposure windows 678, 670 and 677 is provided similar to the embodiment of Figs. 1, 3 and 4.

A differential relay of the type shown in Fig. 13 (relay CR with two differentially acting coils 608 and 610, and appertaining respective circuits) may, of course, also be employed in measuring systems designed in accordance with the other embodiments of my invention as previously described in this specification, and it will also be understood that any of the other systems may be separated into a transmitter station and a remote receiver station as exemplified in Figs. 13 and 14. Such a remote transmission system can be modified in various ways within the scope and principles of my invention. For instance, any other known means of maintaining synchronism between the variable impedance or potentiometer of the measuring apparatus in the transmitter station and the indicating or recording means of the receiver station is applicable. Thus, the drive 675' of the symbol wheel 676 in Fig. 14 may consist of a continuously operating drive which is synchronized with the continuously operating potentiometer VI of the transmitter so that the drive 675' need not be controlled by a relay of the type represented by RL, or receives only a corrective impulse from such a relay. Another possibility is to provide a drive 675' in approximate synchronism with the operation of the potentiometer and to apply both control impulses, issuing before the beginning and within each cycle, to the indicating or recording apparatus. Since these two impulses follow each other in a variable interval whose duration depends on the quantity measured, the distance travelled by the indicating member 676 during this interval is a measure of this quantity. This distance can be indicated or recorded in any suitable way. For instance, if both impulses are passed to a recording device substantially as shown in Fig. 14, then two notations are recorded during each individual measuring period, and the difference between the two recorded indications of the symbol wheel represents the value of the quantity to be measured.

Figure 15:
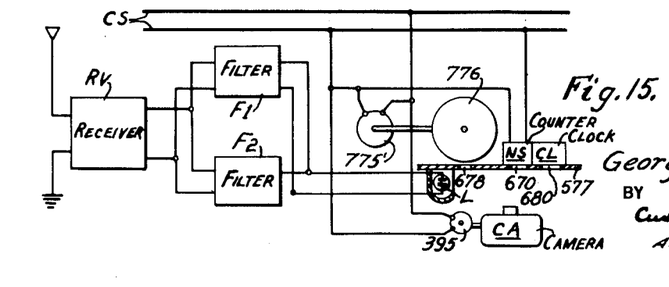

An apparatus of the kind last described is illustrated in Fig. 15 which is similar to Fig. 14 except that the relay RL is omitted and that both filters F1 and F2 are connected to the lamp L. It is assumed in Fig. 15 that the motor 775' for the symbol wheel 776 and the counter NS operate in synchronism with the motor 675 in the transmitter (Fig. 13) and that, as before, the counter NS advances one step for each recording cycle. During each cycle, two light flashes are produced, one at the beginning of the cycle through filter F1 and the other at the moment of balance through filter F2. Hence, the camera CA, driven by motor 395, records two values during each cycle period, and the difference between these values is indicative of the measured magnitude.

It will be understood by those skilled in the art that wherever I have shown a directly operating electric motor controlled by a control impulse, a constantly operating electric or non-electric motor can be employed together with a controllable coupling, such as an electromagnetic clutch, which is caused by the control impulses to connect or disconnect the motor with the part to be driven. Since these and other variants are not part of my invention proper and readily available in this and related arts, they are not illustrated in the drawings. In view of such possibilities within the scope and features of my invention, however, I wish this specification to be understood as illustrative rather than in a limiting sense.

What I claim is:

1. A system for recording a multitude of variable physical quantities comprising, in combination, electric gauging elements for varying the magnitude of an electric condition in response to said quantities respectively, electric measuring apparatus common to said elements for determining said magnitude, selective contact means disposed between said elements and said apparatus for sequentially connecting said elements each for a limited interval with said apparatus so that at a time only one of said magnitudes is measured by said apparatus, said apparatus having an impedance device provided with a movable adjusting member for varying its impedance value and including drive means for moving said adjusting member within each of said intervals so that said impedance assumes a value indicative of said one magnitude, an indicating device having a movable indicator member provided with sequentially arranged different symbols indicative of respectively different magnitude values and means for moving said indicator member in synchronism with said adjusting member, intermittently operating means for recording at a time an image of one of the symbols of said indicator member, and control means connected with said apparatus for operating said recording means in response to the occurrence of said indicative impedance value so that each of the images recorded by said recording means represents one of said quantities.

2. A system for recording a multitude of variable physical quantities comprising, in combination, a multitude of electric gauging elements for varying the magnitude of an electric condition in response to said quantities respectively, selective contact means connected to said elements, electric measuring apparatus attached to said contact means in order to be sequentially connected with said elements when said contact means are in operation, said apparatus having an impedance device provided with a movable adjusting member for varying its impedance over a given range including an impedance value at which the position of said adjusting member is indicative of said magnitude, drive means for actuating said selective contact means and said adjusting member in a given relation to each other so that said impedance variation covers said range during each interval in which one of said elements is connected with said apparatus, an indicating device having a movable indicator member provided with different sequentially arranged indicia indicative of respectively different values and means for moving said indicator member in synchronism with said adjusting member, means for recording, when operative, an image of one of the indicia of said indicator member at a time, and control means connected to said recording means under control by said apparatus so as to render said recording means operative in response to the occurrence of said impedance value, whereby the images successively recorded by said recording means are indicative of said quantities.

3. A system for recording a plurality of variable physical quantities comprising, in combination, a plurality of electric gauging elements for varying the magnitude of an electric condition in response to said quantities respectively, selective contact means connected to said elements, electric measuring apparatus attached to said contact means in order to be sequentially connected with said elements when said contact means are in operation, said apparatus having an impedance device provided with a rotatable adjusting member for varying the impedance of said device over a given range which includes an impedance value at which the angular position of said adjusting member is indicative of said magnitude, drive means for actuating said selective contact means and said adjusting member in a given relation to each other so that said adjusting member moves continuously through one cycle of rotation during each interval in which one of said elements is connected with said apparatus, an indicating device having a rotatable indicator member provided with different sequentially arranged indicia indicative of respectively different values and means for continuously rotating said indicator member in synchronism with said adjusting member, recording means associated with said indicating device for producing, when in operation, an image of one of said indicia of said indicator member at a time, and electric control means connected with said recording means and controlled by said apparatus to temporarily operate said recording means in response to the occurrence of said impedance value, said recording means having means for accommodating a strip member for receiving said images and a drive for moving the strip member so that successively recorded images are produced one above the other along the strip member.

4. A system for recording a plurality of variable physical quantities comprising, in combination, a plurality of electric gauging elements for varying the magnitude of an electric condition in response to said quantities respectively, selective contact means connected to said elements, electric measuring apparatus attached to said contact means in order to be sequentially connected with said elements when said contact means are in operation, said apparatus having an impedance device provided with a rotatable adjusting member for varying the impedance of said device over a given range including an impedance value at which the angular position of said adjusting member is indicative of said magnitude, drive means for actuating said selective contact means and said adjusting member in a given relation to each other so that said adjusting member moves through one cycle of rotation during each interval in which one of said elements is connected with said apparatus, an indicating device having a rotatable indicator member and means for rotating said indicator member in synchronism with said adjusting member, indicating means disposed adjacent to said indicator member and having indicia correlated to said elements, means for actuating said indicating means in accordance with the operation of said selective contact means so that said latter indicia identify the element connected at a time with said apparatus, recording means disposed relative to said indicator member and said indicating means for producing, when in operation, juxtaposed images of their simultaneous indications, and electric impulse transmitting control means connected with said recording means and controlled by said apparatus to temporarily operate said recording means in response to the occurrence of said impedance value, said recording means having means for accommodating a strip member for receiving said images and a drive for moving the strip member, whereby a plurality of notations is successively recorded each composed of the images of indications identifying one of said elements and the correlated quantity to be measured.

5. A system for recording a multitude of variable physical quantities comprising, in combination, a multitude of electric gauging elements for varying the magnitude of an electric condition in response to said quantities respectively, selective contact means connected to said elements, electric measuring apparatus attached to said contact means in order to be sequentially connected with said elements when said contact means are in operation, said apparatus having an impedance device provided with a rotatable adjusting member for varying the impedance of said device over a given range including an impedance value at which the angular position of said adjusting member is indicative of said magnitude, drive means for actuating said selective contact means at a speed correlated to that of said adjusting member so that the latter assumes said position during each interval in which one of said elements is connected with said apparatus, an indicating device having a rotatable indicator member provided with different sequentially arranged indicia indicative of respectively different values and means for rotating said indicator member in synchronism with said adjusting member, recording means associated with said indicating device for producing, when in operation, an image of one of the indicia of said indicator member, and electric control means connected with said recording means and controlled by said apparatus to temporarily operate said recording means in response to the occurrence of said impedance value so that the images successively recorded by said recording means are indicative of said respective quantities.

6. A system for recording a multitude of variable physical quantities comprising, in combination, a multitude of gauging elements for varying the magnitude of an electric condition in response to said quantities respectively, an electric measuring network, selective contact means for sequentially connecting said elements to said network, said network comprising a potentiometric impedance device having a movable adjusting member for varying its impedance over a range including an impedance value indicative of said magnitude, a relay disposed in said network so as to be responsive to the occurrence of said value, drive means for actuating said contact means and said adjusting member in a given relation to each other so that said member performs a cycle of continuous motion during each interval in which one of said elements is connected with said network, an indicating device having a movable indicator member provided with sequentially arranged different symbols and operative in synchronism with said adjusting member, recording means disposed relative to said indicator member for producing, when actuated, an image of one of said symbols at a time, and a control circuit connected between said relay and said recording means for actuating the latter instantaneously during continuous motion of said two members at the moment when said relay responds to said value so that the recorded image is indicative of the quantity to be measured.

7. A system for recording a multitude of variable physical quantities comprising, in combination, a multitude of measuring elements having an electric magnitude variable in response to said quantities respectively, an electric measuring network, selective contact means for sequentially connecting said elements to said network, said network comprising a potentiometric impedance device having a movable adjusting member for varying its impedance over a range including an impedance value indicative of said magnitude, a relay disposed in said network so as to be responsive to the occurrence of said value, drive means for actuating said contact means and said adjusting member in a given relation to each other so that said member performs a cycle of its motion during each interval in which one of said elements is connected with said network, an indicating device having a movable indicator member provided with different symbols and operative in synchronism with said adjusting member, indicating means operative in a given relation to said contact means and having symbols correlated to said elements respectively for identifying the particular element connected at a time to said network, recording means having devices for accommodating a movable record receiving member and being disposed relative to said indicator member and said indicating means for producing on the record-receiving member correlated images of said respective symbols, and a control circuit connected between said relay and said recording means for actuating the latter intermittently each time said relay responds to said value, whereby said recording means produce a multitude of separate and successive notations each composed of an image identifying one of said elements and an image indicative of the appertaining quantity to be measured.

8. A system for recording a multitude of variable physical quantities comprising, in combination, a multitude of gauging elements for varying the magnitude of an electric condition in response to said quantities respectively, an electric measuring network, selective contact means for sequentially connecting said elements to said network, said network comprising an impedance device having a movable adjusting member for varying its impedance over a range including an impedance value indicative of said magnitude, relay means disposed in said network to produce a control impulse in response to the occurrence of said value, drive means for actuating said contact means and said adjusting member in a given relation to each other so that said member performs a cycle of its motion during each interval in which one of said elements is connected with said network, an indicating device having a movable indicator member provided with different symbols and operative in synchronism with said adjusting member, indicating means operative in a given relation to said contact means and having symbols correlated to said elements respectively for identifying the one element connected at a time to said network, a time indicator having a movable symbol carrying indicating device, recording means designed for accommodating a movable record receiving member and being disposed relative to said indicator member and said indicating means and said time indicator so as to produce when actuated correlated images of their simultaneously indicated symbols, said recording means being connected with said relay to be actuated in response to said impulse, whereby said recording means produce a multitude of separate successive notations each composed of images identifying one of said elements, the quantity to be measured and the time of measurement.

9. A system for recording a multitude of variable physical quantities comprising, in combination, a multitude of gauging elements for varying the magnitude of an electric condition in response to said quantities respectively, an electric measuring network, selective contact means for sequentially connecting said elements to said network, said network comprising an impedance device having a movable adjusting member for varying its impedance over a range including an impedance value indicative of said magnitude, drive means for actuating said contact means and said adjusting member in a given relation to each other so that said member performs a cycle of its motion during each interval in which one of said elements is connected with said network, an indicating device having a movable indicator member provided with different symbols and operative in synchronism with said adjusting member, indicating means operative in a given relation to said contact means and having symbols correlated to said elements respectively for identifying the particular element connected at a time to said network, photographic recording means having means for accommodating and moving a photographic recording strip and being disposed relative to said indicator member and said indicating means for producing on the strip correlated images of the simultaneously indicated symbols, means for illuminating said indicator member and said indicating means, and electric impulse transmitting circuit means connecting said illuminating means with said network so as to cause said illuminating means to flash in response to the occurrence of said impedance value.

10. A system for recording variable physical quantities comprising, in combination, a control element for varying a control magnitude in response to the quantity to be recorded, an electric measuring network having an impedance device provided with a movable control member for causing the device to vary its impedance over a range including an impedance value indicative of said magnitude, drive means for periodically actuating said control member, a movable indicating member provided with a series of different symbols, means for continuously moving said indicating member simultaneously with and in a fixed relation to the change in impedance caused by the movement of said control member, photographic recording means having means for accommodating a photographic recording strip and disposed relative to said indicating member for producing on the strip images of said symbols, a light source for illuminating said indicating member in order to expose the strip, and impulse transmitting circuit means connecting said light source with said network to produce an individual instantaneous flash of said light source in response to each individual occurrence of said impedance value, said recording means having means for moving the strip between subsequent flashes so that each flash produces a photographically recorded image spaced from the other images, whereby each individual image is indicative of a recorded quantity.

11. A system for recording variable physical quantities, comprising electric gauges responsive to said quantities respectively, an electric measuring network, selective contact means for sequentially connecting said gauges to said network, said network comprising a potentiometric impedance device having a movable adjusting member for varying its impedance over a range including an impedance value indicative of the quantity to be measured, drive means for actuating said contact means and said adjusting member so that said member performs a cycle of its motion during each interval in which one of said gauges is connected to said network, a movable exhibiting member provided with printing characters and operative in synchronism with said adjusting member, indicating means operative in a given relation to said contact means and arranged in juxtaposition to said indicator member, said indicating means having symbols correlated to said elements respectively for identifying the element connected at a time to said network, means for inking said characters, means for accommodating a recording sheet close to said exhibiting member and said indicating means, and electric means for electrostatically transferring ink onto said sheet from the adjacent character, said electric means comprising an impulse transmitting circuit controlled by said network in response to the occurrence of said indicative impedance value and connected with said exhibiting member and indicating means, said circuit including an electrode for backing the sheet so as to transfer ink from the adjacent character when energized, and means for moving the sheet in order to produce successive recordings each showing the images of characters identifying one of said elements and the appertaining quantity to be recorded.

12. A system for recording variable physical quantities, comprising a control element for varying the magnitude of an electric condition in response to the quantity to be recorded, a balanceable measuring apparatus having a movable control member for varying the balance condition of the apparatus over a range including a balance value indicative of said magnitude, drive means for cyclically moving said control member, a movable exhibiting member provided with a series of different symbols, means for moving said exhibiting member in synchronism with said control member, means for inking said symbols, means for accommodating a recording sheet in closely spaced relation from said exhibiting member, and electric means for electrostatically transferring ink from the adjacent symbols onto the sheet, said electric means comprising an impulse transmitting circuit controlled by said network in response to the occurrence of said indicative impedance value and connected with said exhibiting member, said circuit being provided with an electrode backing the sheet so as to attract ink from said adjacent symbol when energized.

13. A system for recording a plurality of variable physical quantities comprising, in combination, a plurality of gauges for varying the magnitude of an electric condition in accordance with said quantities respectively, selective switch means having contacts connected with said gauges respectively and a movable contact member for sequentially engaging said contacts, a measuring network connected to said contact member and having an impedance device provided with a movable adjusting member for varying the impedance of said device over a range which includes an impedance value indicative of said magnitudes respectively, means for recording said magnitudes as a measure of said corresponding quantities, said recording means having a sheet accommodating member and a step drive for advancing said latter member after completion of each individual record, cyclically operating drive means for actuating said adjusting member, a stepwise operating mechanism for actuating said contact member, contact means controlled in dependence upon the motion of said adjusting member, and circuit means connecting said contact means with said mechanism and said step drive for causing said contact member and said sheet accommodating member to move one step upon completion of each cycle of motion of said adjusting member.

14. A system for recording a plurality of variable physical quantities comprising, in combination, a plurality of gauges for varying the magnitude of an electric condition in accordance with said quantities respectively, selective switch means having contacts connected with said gauges respectively and a movable contact member for sequentially engaging said contacts, a measuring network connected to said contact member and having an impedance device provided with a movable adjusting member for varying the impedance of said device over a range which includes an impedance value indicative of said magnitudes respectively, means disposed for recording said magnitudes as a measure of said corresponding quantities and having a member for advancing a recording strip, cyclically operating driving means for actuating said adjusting member, a stepwise operating mechanism for actuating said contact member, circuit means controlled by said drive means and connected with said mechanism for causing said contact member to advance one step upon completion of each cycle of motion of said adjusting member, and drive means for advancing said strip advancing member after completion of each individual recording.

15. A system for measuring a plurality of variable quantities, comprising in combination, a corresponding plurality of gauges for varying the magnitude of an electric condition in dependence upon said quantities respectively, a lesser plurality of bolometric amplifiers for amplifying said current magnitudes, measuring apparatus for indicating said magnitudes as a measure of said respective quantities, cyclically operating selector switch means disposed between said elements and said amplifiers so as to connect said elements sequentially to said amplifiers and having phase displaced connecting means so that the interval of connection between an element and one of said amplifiers overlaps the immediately preceding and following connecting intervals of other elements, and cyclically operating selective contact means disposed between said amplifiers and said apparatus and synchronized with said switch means so as to sequentially connect said amplifiers with said apparatus during separate periods at the end of the corresponding intervals.

16. A system for measuring a plurality of variable quantities comprising, in combination, a corresponding plurality of gauges for varying the magnitude of an electric condition in dependence upon said quantities respectively, a lesser plurality of electric translating devices of relatively large time constant, cyclically operating selector switch means disposed between said elements and said devices so as to connect said elements sequentially to said devices and having phase displaced connecting means so that the interval of connection between an element and one of said amplifiers overlaps the immediately preceding and following connecting interval of other elements, said switch means having an operating speed of such value that said intervals are commensurate with said time constant, measuring apparatus for indicating said magnitudes as a measure of said respective quantities and cyclically operating selective contact means disposed between said devices and said apparatus and synchronized with said switch means so as to sequentially connect said devices separately with said apparatus near the end of the corresponding intervals, whereby the cooperating intervals of said apparatus are a fraction of said connecting intervals in inverse proportion to the number of said translating devices.

17. A system for measuring variable magnitudes of electric conditions, comprising in combination, a plurality of circuit elements for varying said magnitudes, a plurality of amplifiers of relatively large adjusting period, measuring apparatus for indicating the amplified magnitudes, cyclically operating selector switch means disposed between said elements and said amplifiers so as to connect said elements sequentially to said amplifiers and having phase displaced connecting means so that the interval of connection between an element and one of said amplifiers overlaps the immediately preceding and following connecting intervals of other elements, and cyclically operating selective contact means disposed between said amplifiers and said apparatus and synchronized with said switch means so as to sequentially connect said amplifiers separately with said apparatus near the end of the corresponding intervals.

18. A system for determining variable physical quantities comprising, in combination, an electric gauging element having a reactance value variable in response to the quantity to be measured, a resonance circuit having means for supplying a periodically variable current and including said element, an adjustable reactance device forming part of said resonance circuit, cyclically operating drive means for actuating said device so as to vary its reactance over a range including the resonance condition of said circuit, movable indicating means synchronized with said device so that the position of said indicating means is indicative of the reactance adjustment of said device, and resonance-responsive control means for controlling said indicating means so as to produce an indication at the moment when the adjustment of said device passes through said resonance condition, whereby said indication is indicative of the quantity to be measured.

19. A system for determining variable measuring quantities comprising, in combination, an electric gauge element for varying the magnitude of an electric condition in accordance with the quantity to be determined, an electric measuring network having a potentiometer comprising a circular resistor and a rotatable slide contact for varying the resistance of the potentiometer through a range including a resistance value indicative of said magnitude, drive means for rotating said slide contact, a substantially cylindrical member surrounding said resistor and connected with said slide contact so as to rotate together therewith, said member having a peripheral row of different symbols on its cylindrical surface, recording means having a member for moving a recording strip for receiving images of said symbols, and electric circuit means connected between said network and said recording means for controlling the latter in response to the occurrence of said impedance value so as to produce a record of the images indicative of the quantity to be determined.

20. A system for recording the variations of a plurality of physical quantities comprising, in combination, a plurality of gauging elements responsive to said quantities respectively for controlling the magnitude of a physical condition in dependence upon said variations, electric measuring apparatus common to said elements and having symbol-carrying exhibiting means for indicating said magnitude, selective contact means interposed between said elements and said apparatus for sequentially connecting said elements to said apparatus, indicating means having symbols correlated to said elements respectively and means for sequentially selecting said symbols in accordance with the speed of said selective contact means in order to identify the element connected at a time by said contact means to said apparatus, and means disposed for recording in juxtaposition images of the correlated indications of said exhibiting means and said indicating means and having means for accommodating a surface member and drive means for causing said accommodating means to advance the surface member so that separate successive notations are recorded thereon, each notation comprising the image of a symbol indicative of a measured quantity and another symbol indicative of the element responsive to said quantity.

21. A system for recording the variations of a plurality of physical quantities comprising, in combination, a plurality of gauging elements responsive to said quantities respectively for controlling the magnitude of a physical condition in dependence upon said variations, measuring apparatus common to said elements and having symbol carrying exhibiting means controlled by said control magnitude for indicating the value of said quantities respectively, selective contact means interposed between said elements and said apparatus for sequentially connecting said elements to said apparatus, indicating means having symbols correlated to said elements and means for sequentially selecting said symbols in accordance with the speed of said selective contact means in order to identify the one element connected at a time by said contact means to said apparatus, and a recording device having means for accommodating and longitudinally advancing a recording strip, said device being arranged relative to said exhibiting means and said indicating means so as to record images of the indicated respective symbols in juxtaposition to each other for producing on the strip a plurality of notations spaced from one another along the strip and comprising each the image of a symbol identifying one of said elements and the image of another symbol indicative of the quantity gauged thereby.

GEORGE KEINATH.

REFERENCES CITED

The following references are of record in the file of this patent:

UNITED STATES PATENTS

| Number | Name | Date |
|---|---|---|
| 1,936,683 | Marrison | Nov. 28, 1933 |
| 2,139,105 | Vanderhider | Dec. 6, 1938 |
| 2,321,605 | Keinath | June 15, 1943 |
| 1,933,650 | Bascom | Nov. 7, 1933 |
| 2,244,497 | McNancy | June 3, 1941 |
| 2,366,913 | LeClair | Jan. 9, 1945 |
| 2,240,938 | McNancy | May 6, 1941 |